United States Patent
Stauner et al.

(10) Patent No.: US 9,286,244 B2
(45) Date of Patent: Mar. 15, 2016

(54) METHOD AND DEVICE FOR MONITORING AN UNAUTHORIZED MEMORY ACCESS OF A COMPUTING DEVICE, IN PARTICULAR IN A MOTOR VEHICLE

(75) Inventors: Thomas Stauner, Unterschleissheim (DE); Astrid Schroeder, Munich (DE); Martin E. Thiede, Gauting (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 958 days.

(21) Appl. No.: 11/961,947

(22) Filed: Dec. 20, 2007

(65) Prior Publication Data

US 2008/0178292 A1 Jul. 24, 2008

Related U.S. Application Data

(63) Continuation of application No. PCT/EP2005/006767, filed on Jun. 23, 2005.

(51) Int. Cl.
*G06F 12/14* (2006.01)
*G06F 11/07* (2006.01)

(52) U.S. Cl.
CPC .......... *G06F 12/1441* (2013.01); *G06F 11/073* (2013.01); *G06F 11/0751* (2013.01)

(58) Field of Classification Search
None
See application file for complete search history.

(56) References Cited

U.S. PATENT DOCUMENTS

| 4,093,987 | A | | 6/1978 | Gaudette et al. | |
|---|---|---|---|---|---|
| 5,513,337 | A | * | 4/1996 | Gillespie et al. | 711/152 |
| 5,657,475 | A | * | 8/1997 | Gillespie et al. | 711/163 |
| 5,970,251 | A | * | 10/1999 | Zimmermann et al. | 717/168 |
| 6,049,876 | A | * | 4/2000 | Moughanni et al. | 726/26 |
| 6,640,203 | B2 | * | 10/2003 | Brown et al. | 702/186 |
| 7,168,065 | B1 | * | 1/2007 | Naccache et al. | 717/127 |
| 7,873,947 | B1 | * | 1/2011 | Lakhotia et al. | 717/126 |
| 2002/0116151 | A1 | | 8/2002 | Brown et al. | |
| 2002/0174361 | A1 | * | 11/2002 | Hurich et al. | 713/200 |
| 2005/0071668 | A1 | * | 3/2005 | Yoon et al. | 713/200 |

(Continued)

FOREIGN PATENT DOCUMENTS

| DE | 699 07 709 T2 | 3/2004 |
|---|---|---|
| EP | 0 897 144 A2 | 2/1999 |

OTHER PUBLICATIONS

International Business Machines Corporation, "Method for implementing precise exceptions", Research Disclosure, vol. 431, No. 185, Mar. 2000, Mason Publications, Hampshire, GB, XP007125746.
"Memory Fault Termination Prevention Procedure", IBM Technical Disclosure Bulletin, vol. 38, No. 1, Jan. 1995, pp. 259, IBM Corp., New York, XP000498762.
"Exception Handler that Determines Error Location", IBM Technical Disclosure Bulletin, vol. 41, No. 1, Jan. 1998, pp. 17-18, IBM Corp., New York, XP000772007.

(Continued)

*Primary Examiner* — Michael R Vaughan
(74) *Attorney, Agent, or Firm* — Crowell & Moring LLP

(57) ABSTRACT

A method and a device for monitoring an unauthorized memory access to a predetermined memory area in a computing device are described, in which a monitoring medium is provided, having at least one sensor medium, which is set up for the purpose of recognizing an event of the computing device, and at least one recognition medium, which is set up for the purpose of tracking the behavior of the event recognized by the sensor medium, the monitoring medium being integrated into a sequence pattern on the computing device, and the monitoring medium being set up for the purpose of monitoring the sequence pattern at its runtime, in that memory accesses to a memory address or an address range are detected by the monitoring medium as events.

19 Claims, 2 Drawing Sheets

(56) References Cited

U.S. PATENT DOCUMENTS

| | | |
|---|---|---|
| 2006/0080497 A1* | 4/2006 | Boning ..................... 711/103 |
| 2006/0156005 A1* | 7/2006 | Fischer et al. ............. 713/176 |
| 2013/0232343 A1* | 9/2013 | Horning ................ G06F 21/14 |
| | | 713/190 |

OTHER PUBLICATIONS

International Search Report dated Mar. 8, 2006 including English translation (Six (6) pages).

* cited by examiner

METHOD AND DEVICE FOR MONITORING AN UNAUTHORIZED MEMORY ACCESS OF A COMPUTING DEVICE, IN PARTICULAR IN A MOTOR VEHICLE

CROSS REFERENCE TO RELATED APPLICATIONS

This application is a continuation of PCT International Application No. PCT/EP2005/006767, filed Jun. 23, 2005, the entire disclosure of which is herein expressly incorporated by reference.

BACKGROUND AND SUMMARY OF THE INVENTION

The present invention relates to a method and a device for monitoring unauthorized memory accesses to a predetermined memory area in a computing device, in particular in a motor vehicle.

The term "memory protection" is to be understood as the capability of an operating system running on a microcomputer of effectively preventing individual processes of the operating system from accessing those memory areas for which they do not have authorization.

An unauthorized memory access is typically prevented with the support of the microcomputer, i.e., with hardware components. These are often special, costly components. Thus, there are microcontrollers (e.g., MPC 566 from Motorola) which are provided with a memory protection unit. However, these are subject to various restrictions. Thus, for example, only four contiguous memory areas may be protected simultaneously by the memory protection unit. Furthermore, the protection may not be applied equally to all types of memory, such as internal and external memories or volatile and nonvolatile memories.

In a computing device having multiple computers which is implemented in a CAN (controller area network) in a motor vehicle, for example, the computers identified as control units are not provided with memory protection implemented in software for cost reasons. In such computers which do not support memory protection, it is not possible to prevent processes from unauthorized access to memory areas. This may result in problems if sequence patterns of the computing device and/or of a computer are used dynamically and automatically, for example, when updating a sequence pattern. Unauthorized memory accesses may result in errors in other sequence patterns or computers of the computing device.

Therefore, there is a fundamental need for preventing unauthorized memory accesses, in particular to a predetermined memory area in a computing device.

German Patent Document DE 699 07 709 T2 describes a process monitor in a computer system. This device is used in particular in monitoring a procedure and/or process which is referred to as the daemon (CMSD) of a configuration management system (CMS). A daemon provides a background service in a computing device. It manages various system units or objects, which may be physical devices or also software units. If the CMSD service is no longer available, at least parts of the mode of operation of the computing device may be impaired. To provide a process monitor having a high degree of reliability and to ensure an automatic restart of a monitor process which has broken down or is flawed, it is suggested that a process monitoring unit be provided, the monitored process not being a daughter of the process monitoring unit. In the scope of the monitoring, the identity of a monitored process is uniquely determined and the correct operation of the monitored process is verified. If correct operation of the monitored process cannot be verified, the monitored process is restarted and a unique self-identification of the monitored system in relation to the computing device is caused after the restart. The described device has the disadvantage cited at the beginning, that on one hand there is no direct monitoring of an unauthorized memory access to a predetermined memory area and, on the other hand, an additional unit in the form of hardware components must be provided.

The object of the present invention is to specify a method and a device for monitoring an unauthorized memory access to a predetermined memory area in a computing device, in particular for a motor vehicle, so that the computing device cannot assume an undefined state. In particular, no additional hardware components are to be necessary.

One exemplary aspect of the present invention comprises monitoring an unauthorized memory access to a predetermined memory area in a computing device in that the information contained in the specification of a sequence pattern about memory accesses of this sequence pattern is integrated in a suitable way therein for monitoring purposes of the sequence pattern.

The method for monitoring an unauthorized memory access to a predetermined memory area in the computing device, in particular in a vehicle, is characterized by the following steps: firstly, a sequence pattern is provided in the computing device. Furthermore, a monitoring medium is provided, having at least one sensor medium, which is set up for the purpose of recognizing an event of the computing device, and having at least one recognition medium, which is set up for the purpose of tracking the behavior of the event recognized by the sensor medium. In a further step, the monitoring medium is integrated into the sequence pattern. The sequence pattern is monitored at its runtime, in that memory accesses to a memory address or an address range are detected by the monitoring medium as events.

The monitoring medium does not represent an element of the computing device implemented in hardware, but rather is a computer program product, which is integrated in a suitable way in the sequence pattern implemented as software. Accordingly, the sensor medium is a "software sensor" and the recognition medium is also implemented in software. This procedure allows memory accesses of the sequence pattern to be monitored at its runtime in operation. In particular, it is possible to detect unauthorized memory accesses and deal with them suitably. This is based on the assumption that the specification is established in such a way that according to the specification, an unauthorized memory access to a predetermined memory area in the computing device is not allowed. Errors, i.e., unauthorized memory accesses, which were not recognized in preceding tests, for example, may be recognized by the monitoring of the sequence pattern at the runtime. The operational reliability of the sequence pattern and/or of the computing device is thus increased.

According to an expedient design, the step of generating the monitoring medium is provided, in that a specified behavior of the sequence pattern having at least one event and the states and state changes assigned to the at least one event is established, the specified behavior being converted into program code. In other words, this step provides that the specified behavior of the sequence pattern, which is provided in text form, for example, is converted into a form readable and processable by the computing device.

In one embodiment, authorized and/or unauthorized address ranges of a memory device are established in the step of generating the monitoring medium, a behavior deviating from the specified behavior existing if the sequence pattern wishes to perform an access to an unauthorized address range. In the specification, those memory areas of the memory device are thus identified, in tabular form, for example, which are to be protected from an unauthorized memory access. These may be those memory areas in which the operating system of the computing device or of a computer of the computing device is stored, for example. During the monitoring of the sequence pattern at its runtime, it is detected whether or not the sequence pattern wishes to perform a memory access. If so, there is a comparison of the desired memory address to the memory addresses established in the specification. If a correspondence is established, a previously defined fixed reaction may be initiated, e.g., the access of the sequence pattern to the desired memory area may be prevented.

According to a further exemplary design, the generation of the monitoring medium, and in particular the conversion of the monitoring medium into the program code, is performed automatically. In this way, a high efficiency of the program code is ensured, i.e., the monitoring medium only requires a few memory resources. Furthermore, the sequence pattern, if it operates correctly, is not impaired by the monitoring medium.

According to a further exemplary preferred design, the step of integrating the monitoring medium in the sequence pattern comprises introducing the program code into a sequence pattern program code. After, in the step of generating the monitoring medium, the specified behavior of the computing device has been brought into a form readable by the computing device in the form of a computer program product, in the step of integrating the monitoring medium, this existing program code is integrated into the program code of the sequence pattern. The integration may comprise adding additional code lines to the sequence pattern program code. The integration may also comprise providing additional objects or modules. A combination of the cited possibilities is also conceivable.

According to a further exemplary design, an access to a memory area attempted by the sequence pattern is monitored as an event, a check being performed by the monitoring medium as to whether the memory access occurs in an unauthorized or an authorized memory area, in case of access to an unauthorized area, a denial of the memory access and/or the call of an error handling routine and/or a signaling of the unauthorized memory access by the sequence pattern occurring as a reaction. Specifically, the deviation is established by the recognition medium of the monitoring medium, which may differentiate unauthorized memory accesses from authorized memory accesses.

According to a further exemplary design, in the event of detection of an event by the monitoring medium, more precisely the sensor medium of the monitoring medium, there is a function call in the sequence pattern program code. The integration of the monitoring medium in the sequence pattern thus provides the possibility of performing a check of its behavior at predefined points in the sequence pattern, i.e., a check for an unauthorized memory access, and calling a predefined function, which may include signaling, storing variables, or similar actions, for example, in the event of a deviation from a specified behavior.

According to one exemplary variant, the monitoring medium is provided in one computer of multiple computers, and this computer of the multiple computers of the computing device is monitored in regard to its sequence pattern, i.e., an unauthorized memory access.

According to another exemplary variant, the monitoring medium is provided in at least two computers of multiple computers of the computing device, and memory accesses between the computers of the computing device are monitored. Which of the two variants is selected, possibly in a combination, is a function of the procedure of integrating the monitoring medium into the sequence pattern.

The same advantages are connected to the device according to the present invention as were described above in connection with the method.

In the exemplary device according to the present invention for monitoring an unauthorized memory access to a predetermined memory area in a computing device, in particular in a motor vehicle, a monitoring medium having at least one sensor medium is provided, which is set up for the purpose of recognizing an event, in particular a desired memory access, of the computing device. At least one recognition medium is provided, which is set up to track the behavior of the event recognized by the sensor medium, the monitoring medium being integrated in a sequence pattern on the computing device and the monitoring medium being set up for the purpose of monitoring the sequence pattern at its runtime, in that memory accesses to a memory address or an address range are detected by the monitoring medium as events.

In one design, the computing device has multiple computers coupled to one another, the monitoring medium being situated in at least one of the computers.

In another design, the computing device is a bus system and the computers are bus users of this bus system, which are coupled to one another via a bus line, via which the exchange of messages is possible. A bus user represents a control unit of a bus system.

In a further design, the monitoring medium is a computer program product which is integrated in the sequence pattern.

A further design provides that the monitoring medium is implemented to monitor at least one of the computers of the computing device.

Another design provides that the monitoring medium is implemented to monitor memory accesses between at least two computers of the computing device.

Furthermore, the present invention describes a computer program product for a computing device of a motor vehicle, in which a monitoring medium is integrated in a sequence pattern controlling the computing unit, which comprises a computer-readable specification of the behavior of the sequence pattern and is set up for the purpose of establishing memory accesses at the runtime of the sequence pattern and initiating a reaction thereto, if there is a memory access to an unauthorized memory area of a memory device of the computing device.

Other objects, advantages and novel features of the present invention will become apparent from the following detailed description of the invention when considered in conjunction with the accompanying drawings.

BRIEF DESCRIPTION OF THE DRAWINGS

The present invention is explained in greater detail in the following on the basis of the figures.

DETAILED DESCRIPTION OF THE DRAWINGS

Figure 1:
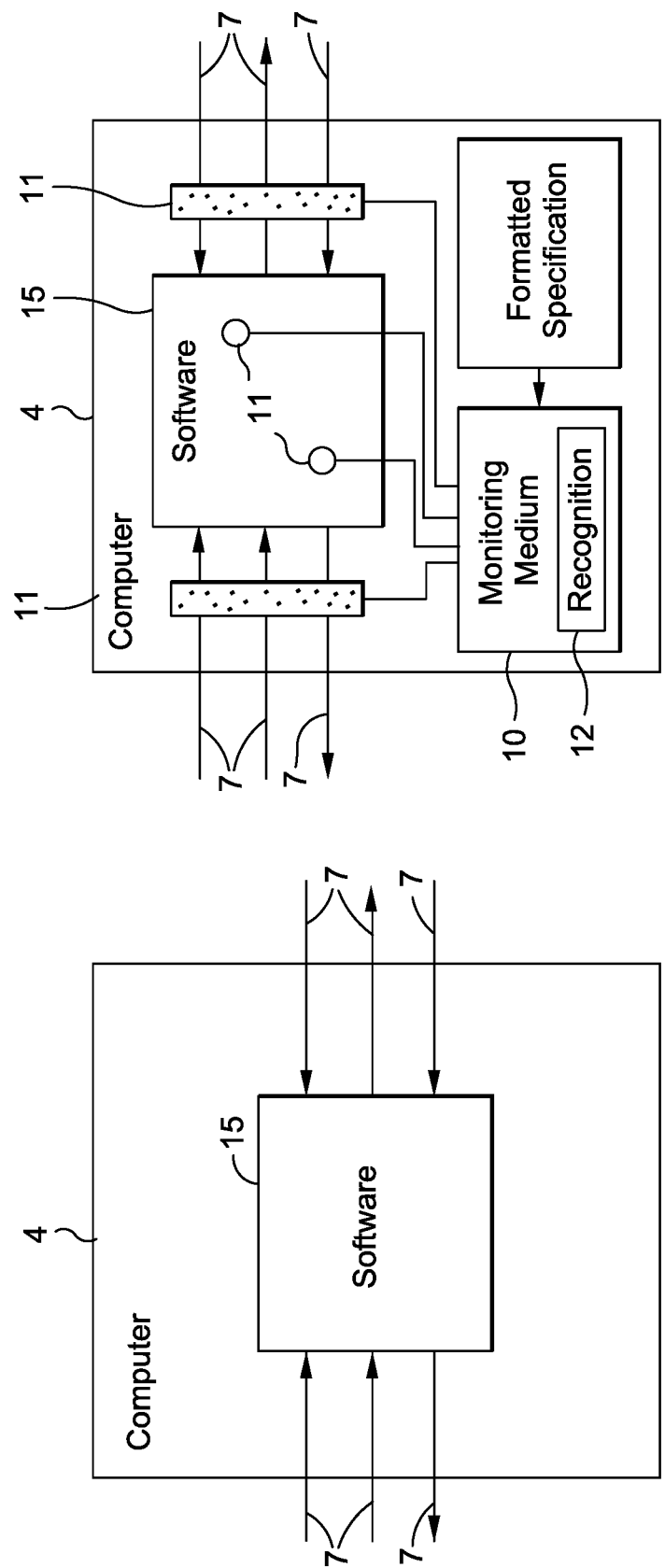
FIG. 1 shows a device according to the present invention for monitoring a sequence of a computing device.

FIG. 1 shows two computers 4, implemented as bus users, of a computing device 1, an illustration without the monitoring medium according to the present invention being shown in the left half and an illustration with the exemplary monitoring medium according to the present invention being shown in the right half. Components (not shown in greater detail in the figure) are provided in the computer 4, which firstly allow a sequence pattern 15 (software) to be applied and executed. In particular, the computer 4 has a memory unit, which may comprise volatile and/or nonvolatile memories and in which areas may be provided for an operating system, one or more sequence patterns, and possibly further sequence pattern components. The computer 4 has multiple data inputs and outputs 7, via which data may be transferred to the computer 4 and from the computer 4. The functionality of the computer is essentially determined by the sequence pattern 15. The sequence pattern 15 receives the information delivered via the data inputs and outputs 7, processes it according to the sequence pattern 15, and provides results at, for example, at least some of the data inputs and outputs 7. The smooth execution of the sequence pattern 15 is essentially ensured by careful testing.

To avoid an undefined malfunction of the computer 4 in case of an unauthorized memory access, the computer 4 shown in the right half of FIG. 1 is provided with a monitoring medium 10, which has sensors 11 and recognition medium 12. The number of four sensors 11 and one recognition medium 12 shown in FIG. 1 is solely selected as an example and may be selected arbitrarily in practice. The schematic illustration shows two sensors 11, which filter the messages transmitted via the data inputs and outputs 7 and supply them to the recognition medium 12. Furthermore, two sensors 11 are provided in the interior of the sequence pattern 15, which detect specific events of the sequence pattern 15 and supply the recognized events to the recognition medium 12. The sensors 11 and the recognition medium 12 are implemented in the form of software code sections, which are integrated at suitable points in the sequence pattern 15 in the way described below.

Figure 2:
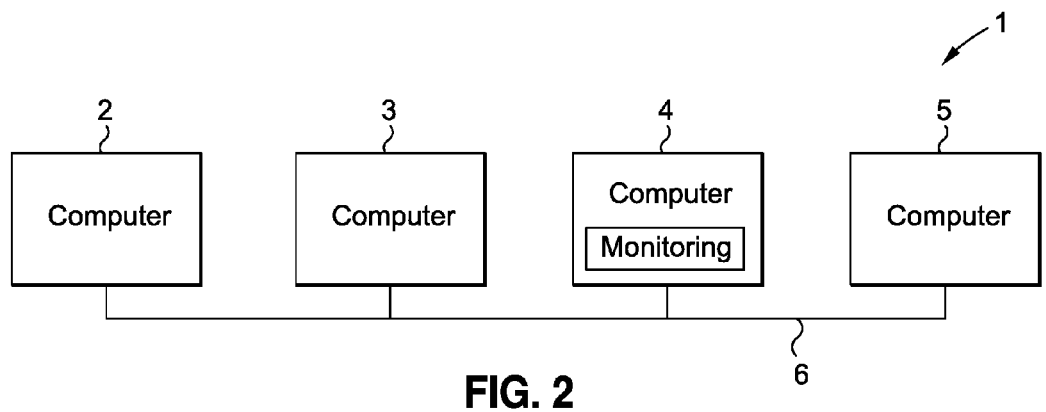
FIG. 2 shows a computing device according to the present invention having multiple computers, in which the device for monitoring is integrated in one of the computers.
Figure 3:
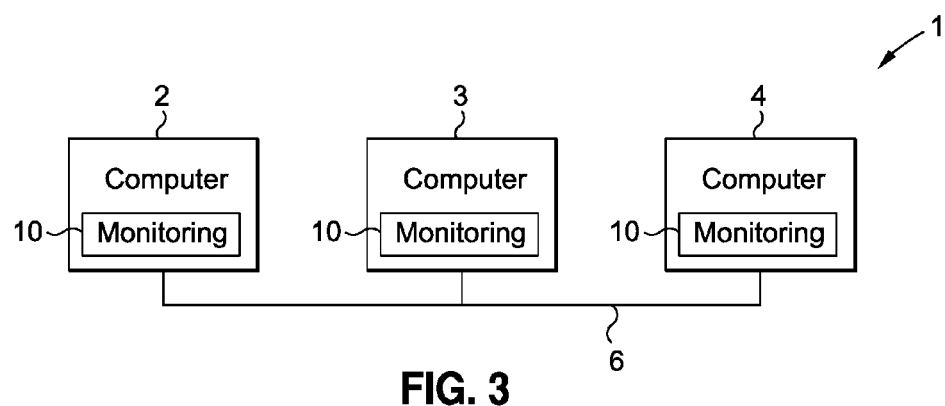
FIG. 3 shows a further computing device having multiple computers, in which the device for monitoring is distributed in multiple computers.

FIG. 2 shows a computing device 1, which has a total of four computers 2, 3, 4, 5, of which the computer 4 is equipped in the way described above with a monitoring medium 10. An alternative exemplary embodiment is shown in FIG. 3, which only comprises three computers 2, 3, 4 as an example, the monitoring medium 10 being situated distributed in all of the computers 2, 3, 4. In both exemplary embodiments, the computers are coupled to one another via a bus line 6, via which the computers may exchange messages. While the exemplary embodiment in FIG. 2 only provides monitoring the behavior of the sequence pattern of the computer 4 for unauthorized memory accesses, using the illustration shown in FIG. 3, the interplay of the individual components may be monitored if one of the computers wishes to access the memory unit of one of the other computers. The monitoring of the sequence pattern of the computing device may thus be performed in two ways in operation. Monitoring at the component level is possible, within which the monitoring medium monitors a computer of the computing device as a component of the computing device. Monitoring at system level is also possible, in which the interplay of the individual components, i.e., computers of the computing device, is monitored.

In another embodiment (not shown), a combination of the two illustrated forms from FIGS. 2 and 3 may also be provided.

To be able to integrate the monitoring medium according to the present invention in one or multiple computers, the following procedure is expedient. The requirement is a specification which describes the desired behavior of a computing device, i.e., of a sequence pattern of the computing device, precisely and in detail. It particularly contains information about unauthorized memory areas of the memory unit, which are assigned exclusively to the operating system, for example. This specification or parts of the specification of the computing device to be monitored are formalized in a suitable language. The monitoring medium is generated generatively, i.e., automatically, from the prepared formal specification before the computing device is put into operation. The relevant information from the specification provided in formalized form is incorporated into the monitoring medium. The monitoring medium containing the specification is applied together with the sequence pattern to the computing device, i.e., either one or multiple computers. During the operation of the computing device, which may be a bus system in a motor vehicle, for example, it collects all information relevant for fulfilling its monitoring task. This is performed using the software sensors described at the beginning, which are part of the generated monitoring medium and register memory accesses of the sequence pattern. Upon establishing a deviation from the specification, i.e., upon establishing an unauthorized memory access, a predefined reaction is initiated, e.g., the denial of the access. The reaction may also comprise turning off and/or restarting the computing device, calling a predetermined routine, or the like, for example.

Figure 4:
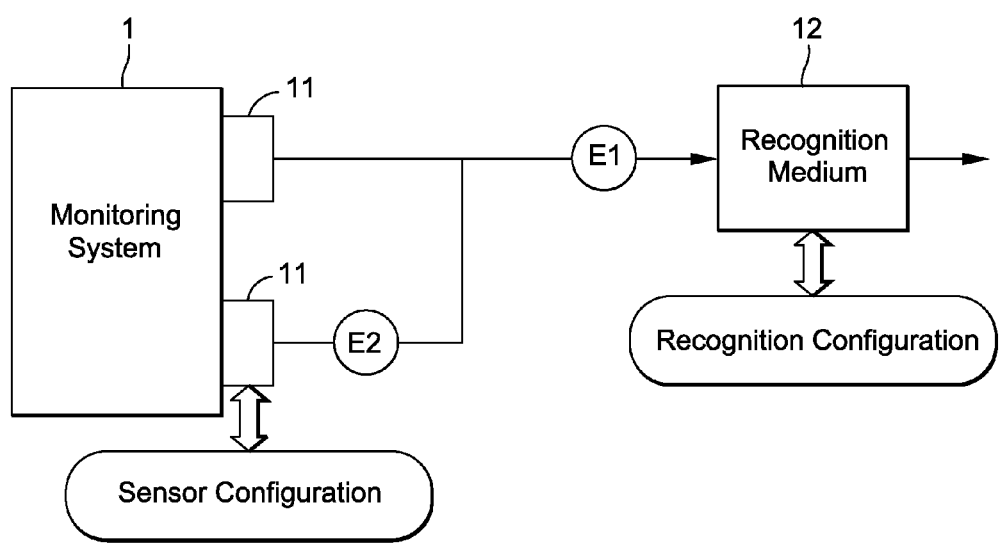
FIG. 4 shows a schematic illustration from which the principle the device for monitoring is based on may be inferred.

The sequence of the monitoring may be better seen from FIG. 4. The logical viewpoint of the sequences is understandable therefrom. Software sensors 11, which observe memory accesses in the computing device 1, are attached in the computing device 1 to be monitored. If one of the sensors 11 detects a memory access (event E1 and/or E2), it relays it to the recognition medium 12, which tracks the behavior (e.g., the desired address) of the system to be monitored on the basis of the incoming event. In case of an access to an unauthorized memory area, the recognition medium 12 may initiate a reaction as described above. The sensors and the recognition medium together form the monitoring medium. From a logical viewpoint, the specified behavior which the recognition medium compares to the actual behavior of the computing device is fixed in a recognition configuration. In practice, this information is incorporated in the recognition medium 12. The information about the points at which sensors 11 are to be placed in the computing device to be monitored is contained in a sensor configuration which is prepared in the scope of formalizing the specification.

By using function calls and/or embedded code, the monitoring may be performed with minimal effort at the runtime. The generated code is similarly efficient to handwritten code. Simultaneously, the generation offers significant advantages over manually prepared code: the generator ensures that no conflicts arise due to identical naming of program variables. The predefined module concept ensures clarity and ability to maintain the monitoring medium. Simultaneously, the generator may ensure that no undesired loops are hidden in the monitoring code, which could cost resources at the runtime or could significantly disturb the execution of the computing device.

After the monitoring medium is generated, it is applied to the computing device. The basic assumption is that the corresponding computer(s) has/have free resources. The generated monitoring medium is highly efficient in regard to its memory and computing time demands. How high the resource requirements for a special monitoring medium are is a function of the specification, which is used as an input of the generation. In principle, it is possible to have the resource demand of a monitoring scenario be calculated by the generator during the generation. An analysis of the computing time required per monitored event is also possible. In this way, it may be predicted whether the monitoring of each monitored event may function as expected. For example, if an event is communicated by a software sensor from an interrupt, the monitoring usually may not delay working out the interrupt beyond a specific limit.

The present invention allows memory protection to be achieved without explicit hardware support. This is achieved using software sensors and recognition media, which are combined in the monitoring medium. The monitoring medium is set up for the purpose of ensuring the correct function of the sequence pattern. In connection with the present invention, the term the "correct function" of a sequence pattern is to be understood to mean whether or not the sequence pattern accesses a memory area in an unauthorized way.

For implementation, the unauthorized memory areas are first established in the specification. The specification is converted into software code sections and integrated in the sequence pattern to be monitored. The sequence pattern modified in this way comprises the cited software sensors and the recognition medium, which may establish the memory accesses. If an access is attempted in an unauthorized area, it is prevented by the monitoring medium, more precisely the recognition medium. In this way, memory protection is ensured. A boundary condition to be considered is that typically very many memory accesses must be checked per unit of time by the computing device and therefore the monitoring may impair the performance of the computing device.

In detail, the integration of the monitoring medium in the sequence pattern means that software code sections of the monitoring medium are inserted in the program code of the sequence pattern before each point at which a potential unauthorized memory access is performed. These check whether the target address of the intended access falls in an unauthorized memory area. If so, an error may be signaled or the sequence pattern and/or the computing device may be stopped. The additional software code sections of the monitoring medium may be implemented as a function call, the target address being compared to the previously defined, unauthorized memory areas in the called function. The unauthorized memory areas may be stored in tabular form in the memory device for this purpose, for example. However, they may also be integrated in the program section of the called function.

The additional outlay in computing time and memory demand generated by the integration of the monitoring medium in the sequence pattern may be kept low in particular in computing devices and/or computers having a processor having load/store architecture, because a large part of the calculations may be handled in the internal process registers therein and the types of addressing are typically simple to perform. A reduction of the increased outlay is possible in that only targeted, critical areas of the program code of the sequence pattern are provided with the monitoring medium. These may relate to memory accesses of sequence patterns which are loaded by the user of the computing device subsequently to the configuration and delivery of the computing device.

Therefore, a method and a device are provided by the present invention, which ensure the proper functioning of a sequence pattern in a computing device. In the event of use in a motor vehicle, this means that the user of the motor vehicle experiences correct functioning. His safety may thus also be improved.

In addition, further applications are conceivable for the monitoring. Thus, for example, before delivery of a computing device, the monitoring medium may be used in development for simplifying tests. To support the diagnosis, the monitoring medium may recognize error situations and note them in error memory entries.

Errors, which were not disclosed in tests, may be recognized by monitoring a sequence pattern in a computing device, in particular a bus system in a motor vehicle at the runtime. The recognized errors may be signaled and/or prevented. The operational reliability of the computing device is thus increased. With an increasing amount of sensitive data, information security also becomes relevant and may be improved. The diagnosis by detecting the error context may be supported by the recognition of error states. This is possible with minimal effort.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The following list of reference numerals is provided to simplify understanding of the specification and drawings.
1 computing device
2 computer
3 computer
4 computer
5 computer
6 bus line
7 data input and output
10 monitoring medium
11 sensor medium
12 recognition medium
15 sequence pattern

What is claimed is:
1. A method for monitoring an unauthorized memory access to a predetermined memory area in a computing device, comprising the acts of:
  providing a sequence pattern in the computing device, wherein the sequence pattern is processor executable software code which, when executed by a processor, defines the function of the computing device;
  providing a monitoring medium, having only software code sections, having at least one sensor medium which is adapted to recognize an event of the computing device, and at least one recognition medium, adapted to track a behavior of the event recognized by the sensor medium;
  integrating the monitoring medium in the sequence pattern by inserting all of the software code sections comprising the monitoring medium into the processor executable software code comprising the sequence pattern; and
  monitoring the sequence pattern at its runtime, and detecting using only the software code sections that comprise the monitoring medium, as the event, attempted memory accesses to one of an unauthorized memory address and an unauthorized address range, wherein said sequence pattern and monitoring medium are both executed by said processor during said monitoring such that said detecting attempted memory accesses is carried out using only said processor.

2. The method according to claim 1, wherein the step of providing the monitoring medium further comprises establishing a specified behavior of the sequence pattern having at least one event, and states and state changes assigned to the at least one event, and converting the specified behavior into a program code.

3. The method according to claim 2, wherein the step of providing the monitoring medium further comprises establishing at least one of authorized and unauthorized address ranges of a memory, recognizing behavior deviating from the specified behavior if the sequence pattern attempts to access an unauthorized address range.

4. The method according to claim 2, further comprising automatically generating the monitoring medium, and in particular the conversion into the program code.

5. The method according to claim 1, wherein the step of integrating the monitoring medium into the sequence pattern further comprises introducing program code comprising the monitoring medium into program code of the sequence pattern.

6. The method according to claim 1, further comprising monitoring as the event an access to a memory area attempted by the sequence pattern, a check being performed by the monitoring medium whether the memory access occurs in one of an unauthorized and an authorized memory area, and when access is to an unauthorized area, at least one of a denial of the memory access, a call of an error handling routine, and signaling of the unauthorized memory access is performed by the sequence pattern as a reaction.

7. The method according to claim 1, further comprising performing a function call in the sequence pattern upon detection of the event by the monitoring medium.

8. The method according to claim 1, further comprising providing the monitoring medium in one selected computer of multiple computers, the selected computer of the multiple computers of the computing device being monitored for its sequence pattern.

9. The method according to claim 1, further comprising providing the monitoring medium in at least two selected computers of multiple computers, such that memory accesses between the selected computers of the computing device are monitored.

10. The method according to claim 1, wherein the computing device comprises a motor vehicle computing device.

11. The method according to claim 1, wherein integrating the monitoring medium in the sequence pattern comprises inserting software code sections comprising the monitoring medium into the processor executable software code comprising the sequence pattern before at least one location at which a potential unauthorized memory access is performed.

12. A device comprising:
a processor; and
a memory coupled to the processor, the memory configured to store:
   a sequence pattern comprising processor executable software code, which when executed by the processor, defines the function of the computing device, and
   a monitoring medium, having only software code sections, the monitoring medium having at least one sensor medium adapted for recognizing an event of the computing device, wherein the monitoring medium further includes at least one recognition medium adapted for tracking the behavior of the event recognized by the sensor medium,
wherein the monitoring medium is integrated into the sequence pattern in the memory of the computing device by inserting all of the software code sections comprising the monitoring medium into the processor executable software code comprising the sequence pattern, and the monitoring medium is adapted to monitor the sequence pattern at its runtime, and wherein attempted memory accesses to an unauthorized memory address or an unauthorized address range are detected using only the software code sections that comprise the monitoring medium as the event,
wherein said sequence pattern and monitoring medium are both executed by said processor such that said attempted memory accesses are detected using only said processor.

13. The device according to claim 12, wherein the computing device further comprises multiple computers coupled to one another, the monitoring medium being situated in a memory of at least one of the multiple computers.

14. The device according to claim 12, wherein the computing device comprises a bus system of a motor vehicle, and the computers comprise bus users of the bus system, which are coupled to one another via a bus line allowing exchange of messages.

15. The device according to claim 12, wherein the monitoring medium represents a computer program product which is integrated into the sequence pattern.

16. The device according to claim 12, wherein the monitoring unit is adapted to monitor at least one of the computers of the computing device.

17. The device according to claim 12, wherein the monitoring medium is adapted to monitor memory accesses between at least two computers of the computing device.

18. The device according to claim 12, wherein the computing device comprises a motor vehicle computing device.

19. The device according to claim 12, wherein the memory is further configured to store software code sections comprising the monitoring medium which have been inserted into the processor executable software code comprising the sequence pattern before at least one location at which a potential unauthorized memory access is performed.

* * * * *